United States Patent [19]

Gmür

[11] Patent Number: 5,038,973
[45] Date of Patent: Aug. 13, 1991

[54] VESSEL BALANCE

[75] Inventor: Bruno Gmür, St. Gallen, Switzerland

[73] Assignee: Gebruder Buhler, AG, Uzwil, Switzerland

[21] Appl. No.: 325,018

[22] Filed: Mar. 16, 1989

Related U.S. Application Data

[63] Continuation of Ser. No. 948,351, Nov. 6, 1986, abandoned.

[30] Foreign Application Priority Data

Apr. 4, 1985 [CH] Switzerland ............... 01485/85
Apr. 1, 1986 [EP] European Pat. Off. PCT/EP86/00186

[51] Int. Cl.⁵ .................................. B67D 5/08
[52] U.S. Cl. ........................... 222/56; 177/25.12;
   177/50; 177/66; 177/244; 177/DIG. 9; 222/58;
   222/77
[58] Field of Search ............... 222/77, 55-58,
   222/502, 503, 185, 504, 556, 559-562;
   177/DIG. 9, 50, 244, 60, 64, 66, 25.11, 25.12

[56] References Cited

U.S. PATENT DOCUMENTS

| | | | |
|---|---|---|---|
| 1,993,624 | 3/1935 | Reussenzehn | 177/244 X |
| 2,739,797 | 3/1956 | Kemper | 222/503 X |
| 2,872,073 | 2/1959 | Harper | 222/55 |
| 3,124,206 | 3/1964 | Burke | 177/210 R |
| 3,319,828 | 5/1967 | Maxwell | 222/58 X |
| 3,343,725 | 9/1967 | Cannon | 222/502 X |
| 3,345,055 | 10/1967 | Kutscher et al. | 222/77 X |
| 3,853,190 | 12/1974 | Delesdernier | 177/105 |
| 3,889,848 | 6/1975 | Ricciardi et al. | 222/58 |
| 4,320,855 | 3/1982 | Ricciardi et al. | 222/58 X |
| 4,427,133 | 1/1984 | Kierbow et al. | 222/77 |
| 4,475,610 | 10/1984 | Schwarzschild | 177/DIG. 9 X |
| 4,513,830 | 4/1985 | Persbeck et al. | 177/114 X |
| 4,580,698 | 4/1986 | Ladt et al. | 222/77 X |

FOREIGN PATENT DOCUMENTS

| | | | |
|---|---|---|---|
| A8501577 | 4/1985 | European Pat. Off. | |
| 2013687 | 12/1971 | Fed. Rep. of Germany | 222/55 |
| A2384246 | 10/1978 | France | |
| A2532748 | 3/1984 | France | |
| 0143261 | 11/1979 | Japan | 222/77 |
| 142417 | 11/1981 | Japan | 177/50 |
| 7904025 | 11/1980 | Netherlands | 222/77 |
| A429214 | 7/1967 | Switzerland | |
| 777464 | 11/1980 | U.S.S.R. | 222/55 |
| 2003625 | 3/1979 | United Kingdom | 222/55 |
| A2113856 | 8/1983 | United Kingdom | |

OTHER PUBLICATIONS

Technisches Messen, Band 47, Nr. 4, Apr. 1980, Munchen (DE), T. Albertz.
Engineering, vol. 223, No. 10, Oct. 1983, London, paper entitled "Electronically-Controlled Hopper Cones with Sticky Materials", see circle 271.

*Primary Examiner*—Kevin P. Shaver
*Attorney, Agent, or Firm*—Helfgott & Karas

[57] ABSTRACT

Vessel balance for bulk material having a tubular balance section for feed therethrough of bulk material. The balance is adapted during feed intervals of the bulk material to enable determination of the weight thereof. The section cooperates with a feed flap adjacent one of its ends to govern entry of the material into the section and has a closing member at an opposite end. The section and member are supported by at least two weight measuring elements carried by a fixed platform.

20 Claims, 7 Drawing Sheets

VESSEL BALANCE

This application is a continuation of application Ser. No. 948,351, filed Nov. 6, 1986, now abandoned.

TECHNICAL FIELD

The invention relates to a vessel balance for bulk material with a continuous weighing vessel, with which are associated a feed flap, a closing member for a base opening, weight determination elements and control members.

BASIC PRIOR ART

The conventional grain scales or balance has a tiltable, dish-like or shell-like weighing vessel, which is mounted on knife edges and more or less complicated lever mechanisms. To avoid external disturbing influences, e.g. due to unintentional contact, the weighing vessel is protected by a housing, so that generally only part of the lever system is visible from the outside.

Of late, weighing vessels have been provided for emptying purposes with a controllable base flap. Thus, the duration of a weighing cycle can be shortened by corresponding reduction of the moving masses to be damped. This makes it possible to read off the weight values more rapidly on the balance.

A further improvement to the efficiency of balances could be achieved by using electronic control and measured value determination means. However, the mechanical weighing cycle always remains the basic problem of any balance, particularly if an official calibration of the balance is to be carried out. As a result of the falling bulk material and the operation of the closing members, vibrations occur in all directions in space, which must be damped or it is necessary to wait until they have stabilized. A further considerable reduction could be obtained through electronic means and would permit an improvement to the accuracy of measured value determination, provided that the mechanical side can be correspondingly improved.

As a result of increasing automation, generally balances are being used to an increased extent, but still the expenditure for continuous weighing of the bulk material must be kept within acceptable limits.

DISCLOSURE OF THE INVENTION

The problem of the invention is to simplify the construction of a vessel balance and reduce to a minimum the disturbances caused by the bulk material and mechanical elements, so as to be able to make full use of the advantages of rapid and accurate data acquisition by electronic means.

In the case of a vessel balance of the aforementioned type, according to the invention this is achieved in that the continuous weighing vessel is constructed as a pipe section of constant cross-section which is open at the bottom and which is supported on a fixed platform together with the closing member fixed to its bottom by means of at least two circumferentially distributed weight determination elements.

The invention leads to a large number of surprising advantages.

As a result of the pipe shape, during each weighing cycle, product is supplied to the weighing container over virtually its entire height, so that surfaces coming into contact with e.g. flour, grain, etc. are automatically cleaned. As a result of the pipe shape, there are virtually only vertical force components of the falling product flow, so that there are almost no lateral deflecting forces. The weighing container can be support on two weight measuring elements and the bulk material can even be fed in in such a way that the theoretical product fall does not occur precisely in the centre of the cross-section. However, the aforementioned advantages are still retained, which is doubtless due to the fact that the bulk material acts as an additional damping means in the preferably circular, optionally polygonal cross-section.

However, supporting on three weight measuring elements has proved to be particulary advantageous. This leads to a very high degree of symmetry, which also contributes to rapid, precise measured value determination. This makes it possible to construct an efficient balance with a lower constructional and material expenditure.

The invention also allows a large number of particularly advantageous developments. Thus, preferably the continuous weighing vessel is suspended on suspended pendulums, which are fixed at the bottom elastically by means of in each case one rubber damping bush to the continuous weighing vessel and at the top by means of in each case one spherical joint to the weight measuring elements. However, it is also possible to determine the weight values by the per se known mechanical method using a corresponding lever system.

It has proved advantageous in the balance according to the invention to construct it as a housing-less balance, particularly if electrical-electronic measured value determination elements, a computer unit and control members are associated with the weight measuring elements. This construction particularly takes account of hygienic requirements (sanitation) in the food industry, particularly the milling industry, as well as operational reliability. There are only minimum "dead space", which are in direct contact with the inner product path.

The outside of the machine has readily accessible flat structures. Almost all machine intermediate spaces for functionally important elements are eliminated, because these can now be arranged in a very simple and in part protected manner on the outside.

In the vicinity of the feed flap, a supply area is preferably formed and in the region below the closing member a product removal area, with which is associated a pressure compensating tube for compensating the air pressure between the supply area and the product removal area.

A preferred development of the invention proposes linking the supply area and product removal area by a flexible sleeve to the continuous weighing vessel, the transition cross-sections preferably having an identical surface. This makes it possible to completely avoid disturbing air flows, because independently of the closing member position, a pressure compensating tube links the supply area with the product removal area for compensating the air pressure. Thus, air pressure fluctuations do not influence the weighing result.

A further advantageous development idea is based on the fact that on the base opening, linked as a unit with the weighing container, is formed a widened flap area and the free flow cross-section from the continuous weighing vessel into the flap area can be kept optimum from the rheological standpoint by a planned choice of the position of the flaps. The closing member is mounted on the flap area and is consequently also weighed and is constructed as two double base flaps, each of which is pivotable about a horizontal axis passing approximately through the centre of the pipe. Each base flap preferably has an operating cylinder associated with it. Here again there are almost no torques of the two preferably oppositely moved flaps on the continuous weighing vessel or the weight measurement.

A further novel construction concept is based on the fact that in a vessel balance according to the invention, the platform is preferably fixed to three or four colums in height adjustable manner, the columns, preferably being either supported on the floor or are suspended on a ceiling.

The inventive connection of the pipe shape with a platform provides particular advantages during manufacture, in that different type ranges can be produced with only minor increased expenditure. Thus, it is possible to modify either the height or the diameter of the continuous weighing vessel to obtain a range of different volumes. Nevertheless, the entity is a standard unit which can be adapted in a very universal manner. Advantageously the product supply area can be constructed as a feed head unit with feed flap and can be directly supported on the platform. Advantageously the product removal area is constructed as a product reception vessel and is fixed to the platform. This makes it possible to improve a situation which has long been considered unsatisfactory. In most cases, the complete installation arrangement has led to a given, non-variable transfer point of the supplying product feed line and difficulties often occur in connection with the installation of balances. The novel concept of vertical adjustability is very helpful for the initial installation.

The novel balance constitutes a ready to install standard unit, but which can still be very flexibly adapted to the practical circumstances.

Preferably, the electric control box is directly fixed to the platform, pneumatic valves being directly arranged on the control box. Thus, it is possible e.g. to replace a cylinder or even the complete control box with a few manipulations.

Thus, the vessel balance according to the invention has a continuous weighing vessel with a tubular, substantially constant cross-section and a base opening which can be closed or opened by means of a closing member. There is also a weight measuring device connected to the continuous weighing vessel, the latter being supported by means of at least two weight determination elements. Control members are also provided, which on reaching a given weight value open the closing member for emptying the continuous weighing vessel and close it again when emptying has taken place. A feed flap is provided preferably separately from the continuous weighing vessel and by means thereof it is possible to interrupt the product supply on reaching a preselectable weight value. The closable and openable base opening has a cross-section substantially corresponding to the continuous weighing vessel cross-section and the at least two weight determination elements are distributed over the circumference of the pipe cross-section.

SHORT DESCRIPTION OF THE DRAWINGS

The invention is described in greater detail hereinafter and in exemplified manner relative to the drawings, wherein show.

DETAILED DESCRIPTION RELATIVE TO THE DRAWINGS

Figure 1:
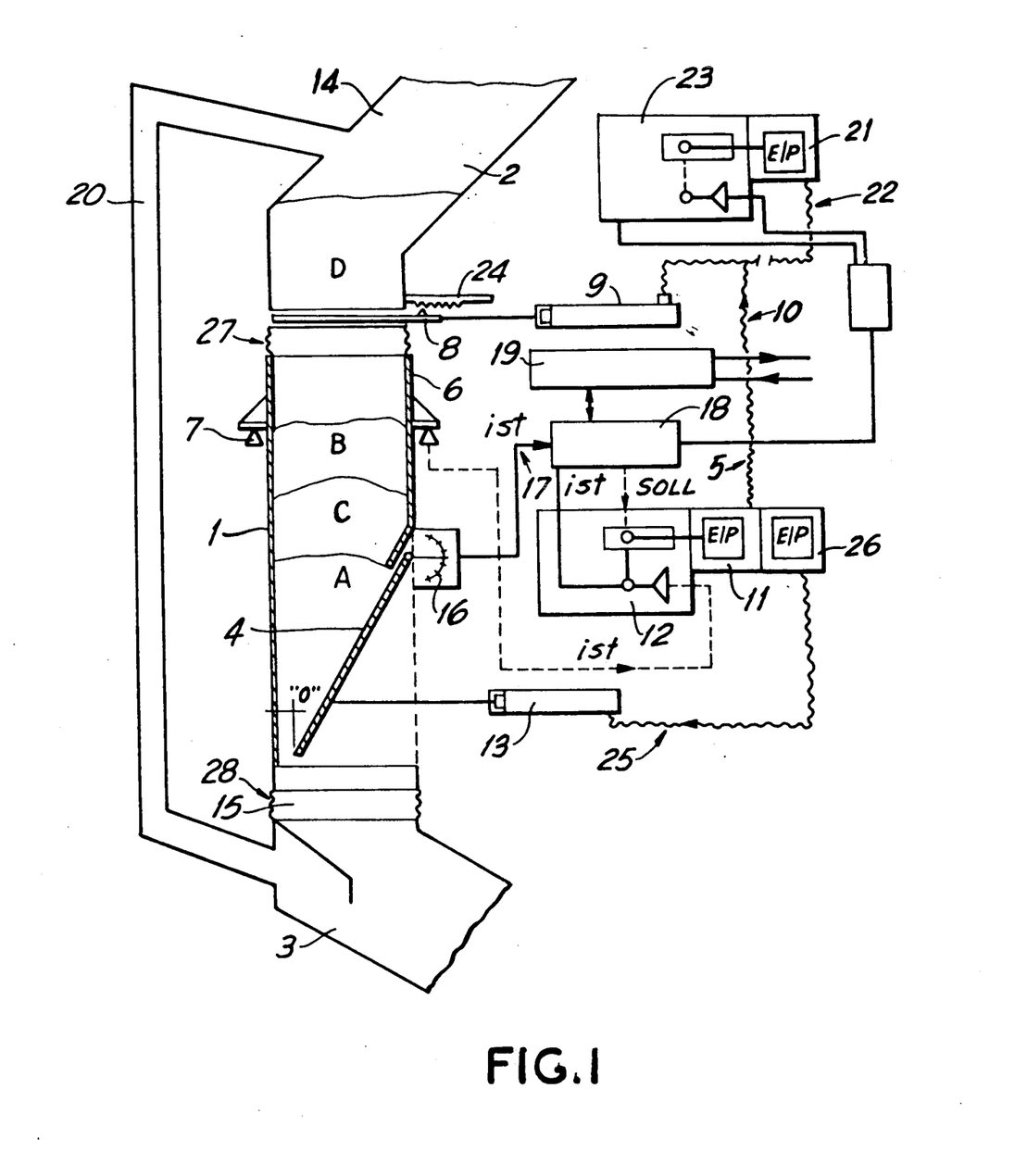
FIG. 1 Diagrammatically a vessel balance according to the invention.

FIG. 1 shows a weighing means, which is provided in its upper region with a supply line 2, in its central region with a tubular balance 1 and in its lower region with a removal line 3. Tubular balance 1 is provided with a closing member 4, by means of which it is possible to close or open the outlet from balance 1. There is also a computer unit and/or control means 5 for evaluating the measured signal supplied by the weighing means. The main part of the tubular balance 1 is formed by a continuous weighing vessel or a weighing container 6, which is supported on two weight measuring elements or pressure cells 7 or on other elements suitable for the rapid determination of instantaneous weight values. In the present case the weighing container 6 is arranged and constructed in such a way that it is part of the feed line, i.e. it is provided with a passage zone, whose cross-section corresponds to that of feed line 2 or removal line 3, or at the most has a cross-section large enough for all wall parts to be covered by product during operation. An important criterion is that during emptying the product is discharged essentially as a closed column, i.e. in the mass flow. This ensures that the product coming from the supply line 2 can flow on without a disturbance in the removal line 3 formed by the internal cross-section of weighing container 6.

Supply line 2 contains a feed flap or a product slide 8, which is operated by means of a pneumatic cylinder 9. Pneumatic cylinder 9 is controlled by means of an air line 10 and an electropneumatic transducer 11, which receives correction signals from a converter 12. As a function of the product, it is advantageous to use as the closing member 4 a curved or flat slide valve or a pendulum flap, which can be operated by not shown electromotive means, e.g. a servomotor or a pneumatic cylinder 13 and which are supplied with compressed air and controlled by means of a control line 25 and an electropneumatic transducer 26. To closing member 4 is also connected a position indicator 16, which can e.g. be constructed as a rotary potentiometer. The corresponding electric signal is transmitted on via a control line 17, which establishes the actual position of the pendulum flap 4 and informs a computer 18.

Pressure cells 7 supply to converter 12 the signal generated by them and corresponding to the measured weight and said converter is connected by means of an operating device 19 to computer 18. Converter 12 is connected to the electropneumatic transducer 11, which is linked with pneumatic cylinder 13 for controlling the timing cycle of tubular balance 1. The represented arrangement permits a simple electronic determination of the measured weight values and the forwarding thereof to computer 18 for calculating the desired product throughput (product quantity per unit of time). In addition, a pressure compensating tube 20 can be provided for eliminating those disturbing factors caused by the possibility of different pressure ratios in supply line 2 and removal line 3. For this purpose, pressure compensating tube 20 can freely connect a supply area 14 directly above weighing container 6 to a product removal area 15 directly below the same and independently of the position of closing member 4.

Figure 7:
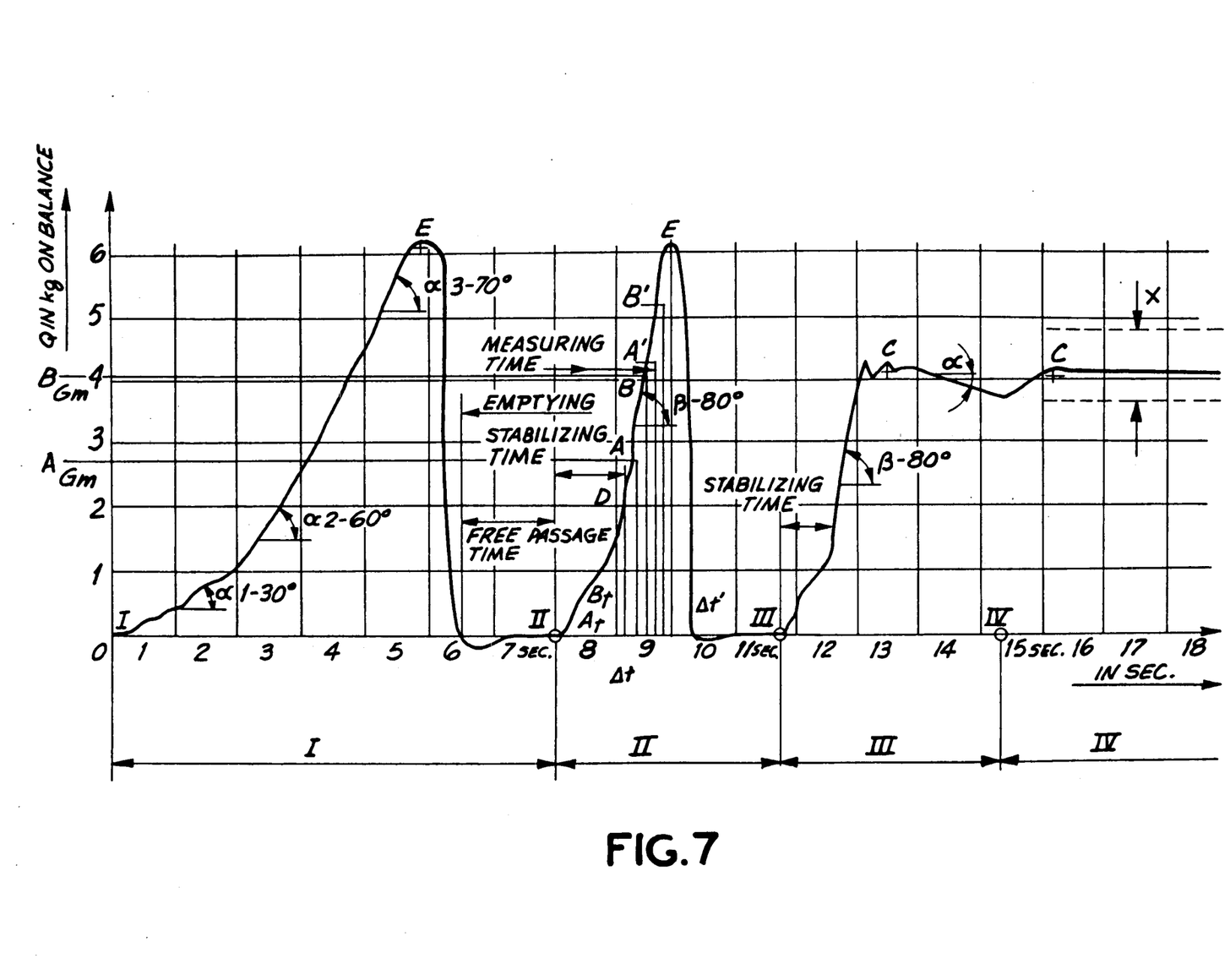
FIG. 7 The course of the weighing signal in a vessel balance according to the invention during several weighing cycles.

As shown in FIG. 7, the inventive vessel balance permits different types of measuring cycle. At the start of a first measurement, the slide valve 4 is moved into the closed position. Weighing container 6 starts to fill and successively reaches fill positions A and B. If the production plant is put into operation again, the balance also shows the initial rise of the product feed (measuring cycle I). After a certain time there is a stable feed-in over the entire measuring time. Weighing container 6 is completely emptied again at the end of the first measurement.

If at the end of each measuring cycle I or II, product slide 8 is closed, it is possible in this way to determine the fill weight of each measuring cycle and to summate all weights over the desired time interval. Thus, in accordance with the conventional use of vessel balances, it is possible to obtain in this way the precise throughput quantity over time.

A further possibility is to determine the instantaneous throughput via the evaluation electronics and use same e.g. for control and regulating purposes.

Reference will now be made to cycle II shown in FIG. 7. The course of the measured weight increase Q is represented in kg over the time t in seconds. Time II indicates the closing time of the balance outlet, i.e. the completion of the closing movement of slide valve 4. With the closing of slide valve 4 and the opening of product slide 8, the weighing container 6 fills and, in accordance with the curve, the weighing signal produced rises from starting point II initially very irregularly and then with definite overshots, because here the complete balance system is made to vibrate by the first impact momentum and therefore overshoots.

However, in the case of good damping, after only a short time and in the represented example after approximately 1 second, stabilization occurs, which roughly corresponds to point D. From then on there is a linear rise of the measured values up to point E, at which the slide valve 4 is opened. Slide 8 is closed. Corresponding to the outflow of product, the weight in tubular balance 1 again drops to zero and as a result of the inertia effects which occur on the balance, there is briefly a negative weight signal. Slide valve 4 then remains open for a certain time until it is closed again. After closure has taken place (repeated closing time of the balance outlet or ended closing movement of slide valve 4), cycle II can be repeated as often as desired.

It is important for the first determination of the constant throughput that in the range of the linear measured value rise, i.e. in the range between the stabilizing point D and the end point of the linear weight rise E at the start of the slide opening, the necessary measurements take place with simultaneous time determination, this permitting a very accurate determination of the instantaneous throughput and the start of stable feed.

However, the novel vessel balance can also be operated in that the closing member 4 is kept in an open position such that the product supply and product removal are of the same magnitude, as represented with measuring cycles III and IV in FIG. 7. Following an average filling in weighing container 6 (filling C), e.g. by regulating the opening position O of closing member 4, a constant product throughput is determined.

The above comments make it clear that the computer 18 can be programmed in such a way that, as a function of requirements, the following data can be fed in or taken in random combination:
  instantaneous throughput;
  totalization and averaged product quantity, e.g. over a cycle time of 10 seconds;
  totalization and averaged product quantity, based on one or more hours;
  in each case a 10, 20 . . . 50 kg momentum, i.e. the effective (calculated) time indication when a given product quantity has flown through;
  a given (predetermined) processing quantity, e.g. 50 t.

FIG. 1 shows a further use possibility. The product throughput is to be regulated over a complete processing period to balance precision (e.g. $+/-0.2\%$, $+/-0.1\%$ precision). The precision is to be maintained instantaneously and as a sum over the processing period.

The supply area 14 is constructed as an accumulation area and the product slide 8 as a discharged dosing means. The latter can be a random known dosing member in accordance with the flow characteristics of the product. The compressed air signals are supplied from an electopnuematic transducer 21 via a compressed air line 22. Computer 18 supplies to a converter 23 the necessary preset desired values, which are used by means of a position indicator 24 for an initial rough setting or the open/close control for the product slide 8 and e.g. simultaneously the supply quantity into the accumulation area can be controlled by not shown discharge and/or supply members. The supply area 14 is connected in dust-tight manner to the continuous weighing vessel 6 by means of a flexible sleeve 27. The transistion cross-section from supply area 14 is identical as regards surface and shape to the corresponding cross-section of the continuous weighing vessel 6. Correspondingly the transition from the continuous weighing vessel 6 to the product removal area 15 is connected with a flexible sleeve 28 in such a way that the free weighing cycle is guaranteed in per se known manner.

Figure 2:
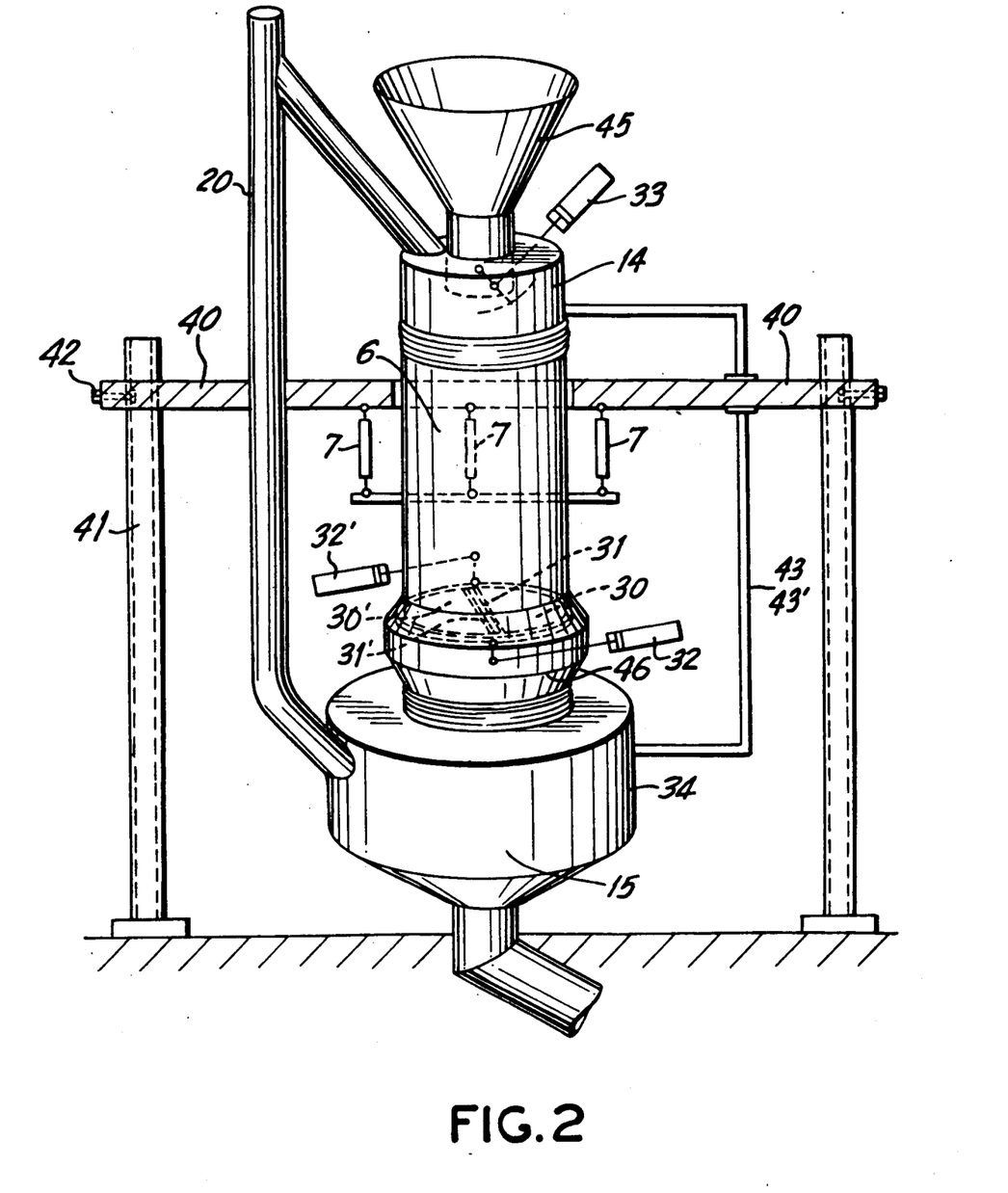
FIG. 2 A solution corresponding to that of FIG. 1 with a plurality of constructional development ideas.

FIG. 2 shown in perspective manner a novel vessel balance (corresponding parts are given the same reference numerals as in FIG. 1). In FIG. 2, the continuous weighing vessel 6 is suspended on three measured value pickups or weight measuring elements 7. The closing member 4 comprises a double base flap. Each flap 30 or 30' has a semicircular shape and in the central region is moved about in each case one axis 31 or 31', the movement taking place from the closed and roughly horizontal position into the open, vertical position. Each of the two axes has its own control cylinder 32 or 32'. By the oppositely direct movement of the two flaps 30, 30', all horizontal torques caused by the flap movement are eliminated. Remaining, very small unequal weights are corrected in the evaluation electronics in accordance with the measured values of all three pickups. Practical tests have confirmed that particularly with three measuring points, the
  measured value obtained are very close to the theoretical or ideal measuring conditions. FIG. 2 shows the three basic means comprising the weighing unit. These are the supply area 14 with an integrated feed flap 33, the product supply area 15, which is designed as a collecting container 34 for the entire content of the continuous weighing vessel 6, as well as the central actual weighing body of the continuous weighing vessel 6, which simultaneously carries the closing member 4. The lower part of the continuous weighing vessel 6 is constructed as a widened flap area 46.

FIG. 2 also diagrammatically shows the reciprocal supporting of the individual components. A platform 40 is preferably carried by three or four columns 41, the height position of the platform being fixed by displacement and tightening of locking screws 42. The supply area or head 14, as well as the product removal area 15 or collecting container 34 are directly arranged on platform 40. The connection is formed by the pressure compensating tube 20 and two further supports 43, 43's. Continuous weighing vessel 6 is suspended on platform 40 by means of the three weight measuring elements 7.

The novel vessel balance can be supplied with product in different ways. In FIG. 2 a silo or container base 45 is located above the balance and the supply head 14 is directly fixed thereto. In this case, feed flap 33 simultaneously serves as the closing slide valve for the silo or container base 45 and a controllable dosing member for the container balance. Computer unit 5 can control the feed flap in such a way that the balance unit simultaneously becomes the dosing member for the product throughput. Supply area 14 is constructed with the feed flap 33 preferably as a feed head unit 44 and is directly fixed by means of supports 43, 43' to platform 40.

Figure 3:
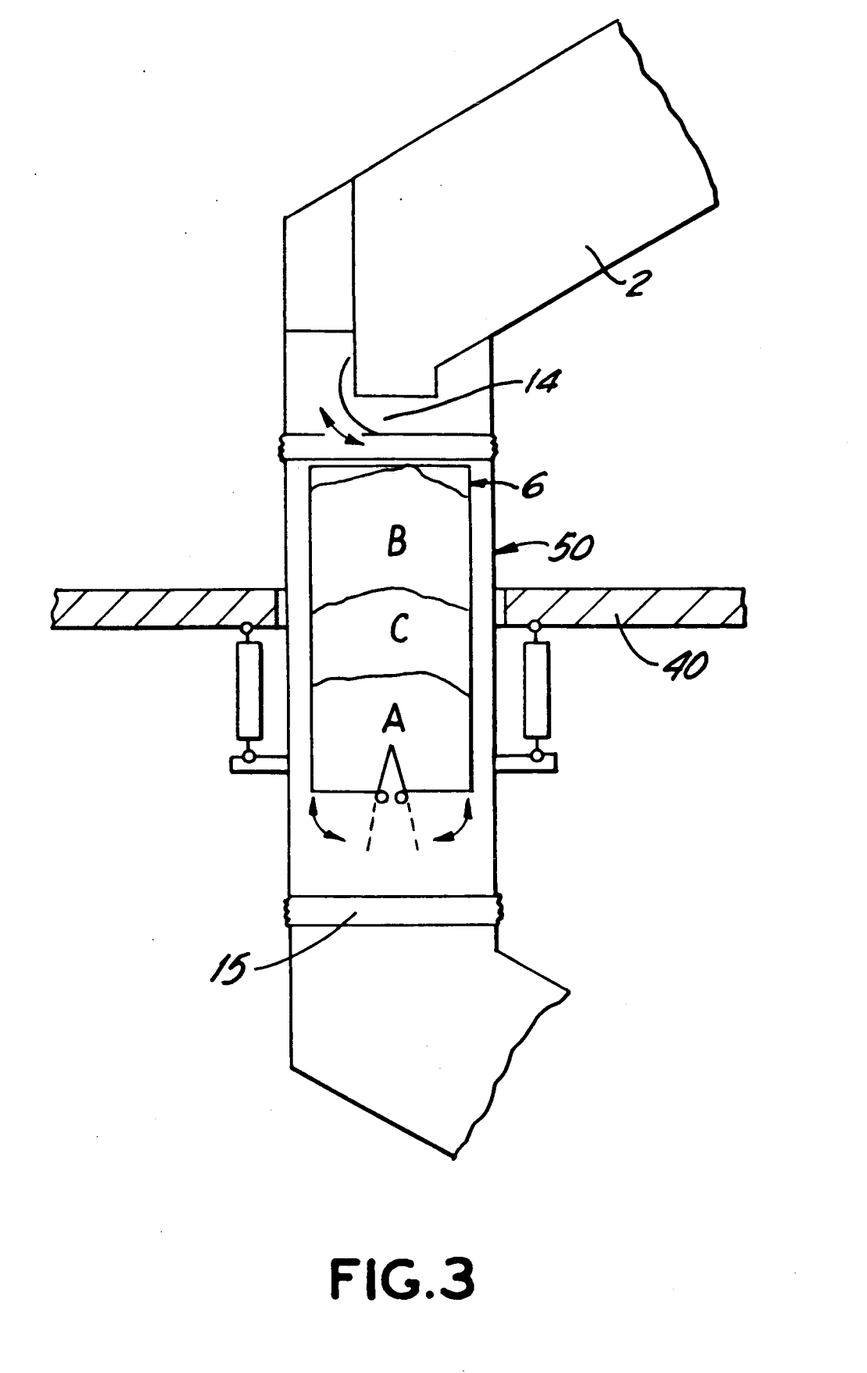
FIG. 3 A further embodiment of the invention.

FIG. 3 fundamentally shows the same construction as FIGS. 1 or 2. All that is different is the pressure compensation from the product supply area 15 to supply area 14, in that a double jacket 50 is arranged on continuous weighing vessel 6, either partly or over the entire circumference thereof.

Figure 4:
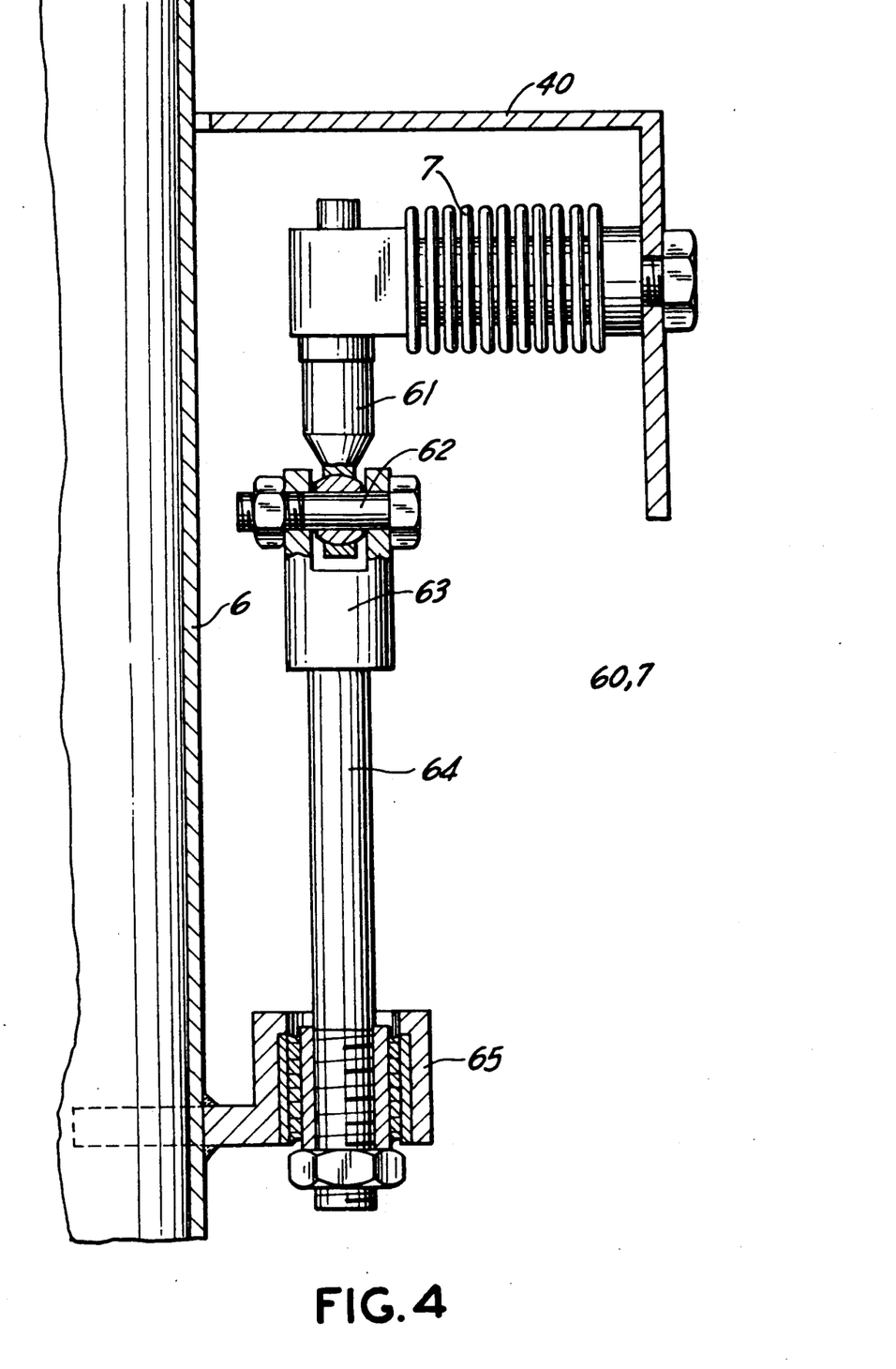
FIG. 4 A suspension system in an inventive vessel balance on a larger scale.

FIG. 4 shows a weight measuring element 7 as part of a suspended pendulum 60. Weight measuring element 7 is a per se known bending rod measuring element, in which the different loads are electronically evaluated by varying the electrical values or wire strain gauges. By means of a clip 61, weight measuring element 7 carries a spherical joint 62, whose internal movable bearing carries by means of a fork 63 and an elastic tie rod 64 at its lower end a rubber damping bush 65 and the continuous weighing vessel 6 connected thereto.

Figure 5:
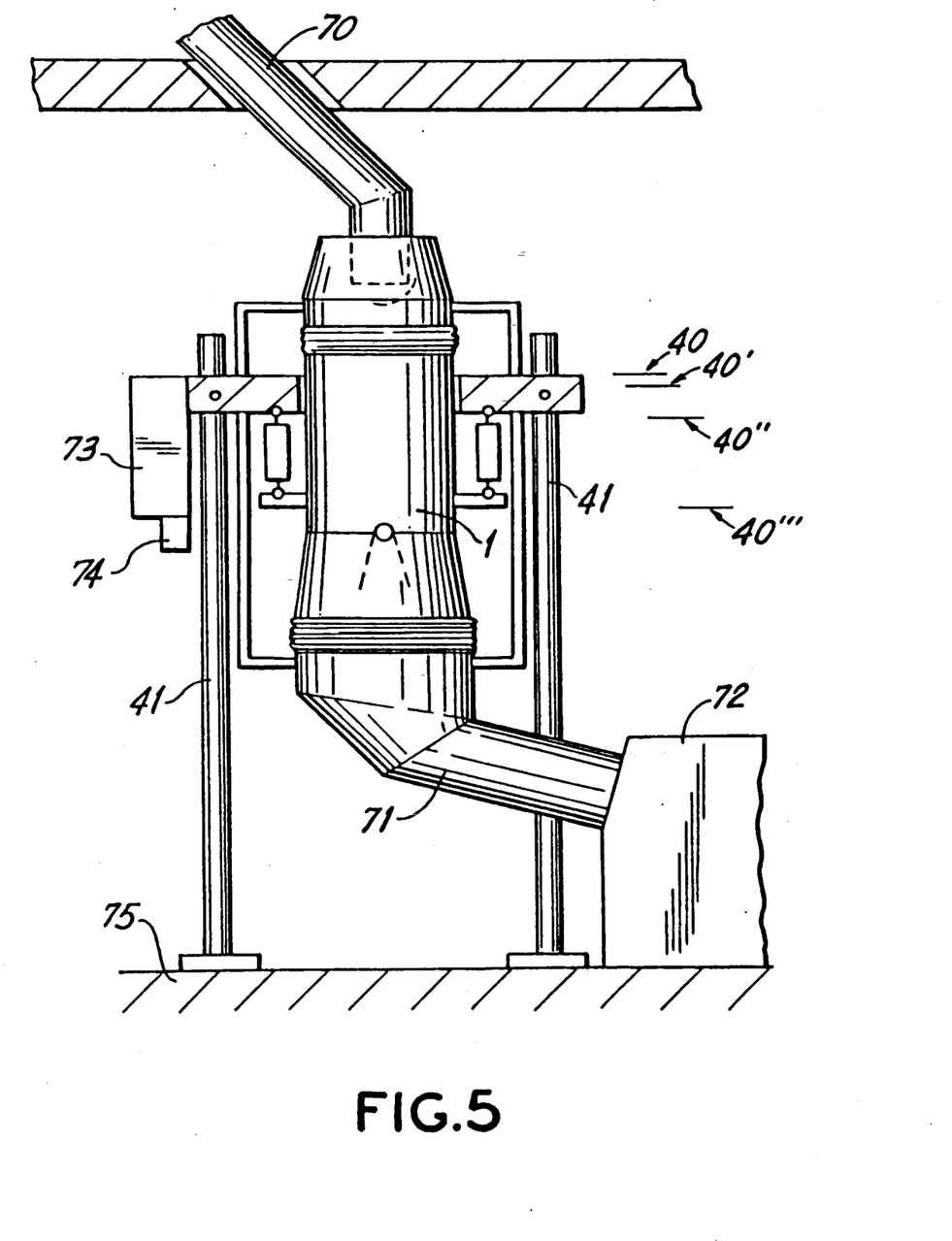
FIGS. 5 and 6 Diagrammatically two installation and realization possibilities of the invention.
Figure 6:
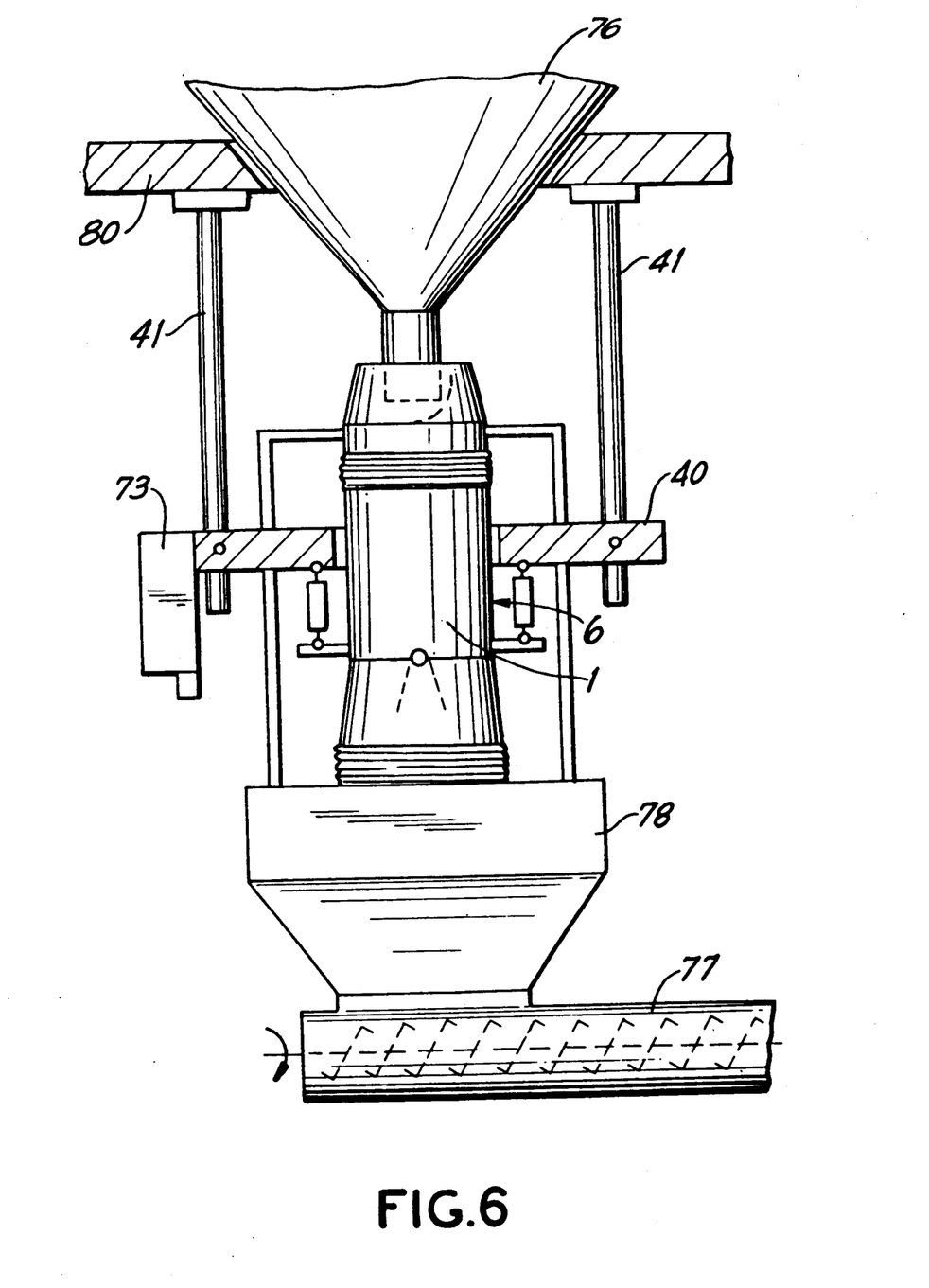

FIGS. 5 and 6 show two possible installation modes for the balance according to the invention. In FIG. 5, the vessel balance is supplied by a down pipe or gravity pipe 70. At the bottom, the product leaves the vessel balance by means of a large removal line 71, which can e.g. be directly passed into a processing machine 72. Correspondingly supports 41 are either directly supported on the machine or, as shown in FIG. 5, on floor 75. Without any special knowledge of balance construction, a fitter can precisely fit the container balance in such a way that it functions perfectly. The unit construction system offers the further advantage here that optimum ease of operation is possible with respect to the electric switchboard 73 with fitted pneumatic control system 74.

Reference numerals 40, 40', 40'', 40''' indicate that the platform 40 can be fixed at a random height without any disadvantage with respect to the balance or weighing function.

FIG. 6 finally shows a suspended construction. In accordance with the precise desired value, the vessel balance directly takes the product from a silo or container 76, which is e.g. fed into the process by means of a screw conveyor 77. In order that the bulk material quantity can be discharged at very short notice, between the continuous weighing vessel and the screw conveyor 77 is provided a product collecting container 34 or an intermediate container 78. Platform 40 is here fixed to the desired height by fixing columns 41 to a storey ceiling 80.

I claim:

1. Continuous bulk material weighing device, comprising:
    a weighing container open at a top and a bottom thereof;
    a bulk material feed line for feeding the material into said weighing container;
    a bulk material discharge line for discharging the material from said container;
    said weighing container being tubular and having a substantially constant cross-section adapted to a cross-section of said feed line and said discharge line, respectively;
    a shut-off member connected to said weighing container for closing and opening said bottom thereof;
    at least two weight-measuring elements connected to said container and circumferentially spaced-apart around said container; and
    a vertically adjustable platform connected to said weight measuring elements so that said container is suspended on said platform by means of said weight-measuring elements.

2. The weighing device according to claim 1, wherein three said weight-measuring elements are provided.

3. The weighing device according to claim 1, and further comprising means connecting said weight-measuring elements to said container, said connecting means each including a suspension pendulum carrying a respective weight-measuring element and having a bottom, a rubber damping bush positioned on the bottom of said pendulum and connected to said container, and a ball joint connected to said respective weight-measuring element and provided on a top of said pendulum.

4. The weighing device according to claim 1, and further comprising electrical-electronic measured-value detection elements, a computer unit and control members all connected to said weight-measuring elements.

5. The weighing device according to claim 1, which is constructed as a housingless weigher.

6. The weighing device according to claim 1, and further comprising a control box and pneumatic valves fastened directly on said control box which is fixed to said platform.

7. The weighing device according to claim 1, wherein the cross-section of the weighing container is substantially equal to the cross-section of the feed line leading to the weighing container and is substantially equal to the cross-section of the discharge line leading away from the weighing container.

8. The weighing device according to claim 1, and further comprising at least three columns supporting said platform, said platform being fastened to said columns at a selectable height.

9. The weighing device according to claim 8, wherein said columns are supported on the ground.

10. The weighing device according to claim 8, wherein said columns are suspended from a ceiling.

11. The weighing device according to claim 1, and further comprising a feed flap positioned at said top of said container for opening and closing said top.

12. The weighing device according to claim 11, and further comprising control means for said shut-off member and said feed flap.

13. The weighing device according to claim 11, wherein a feeding space is formed in said container in the region of the feed flap and a product-discharge space is formed in said container in the region below said shut-off member, said feeding and product-discharge spaces being connected to each other via a pressure-equalizing pipe for equalization of compressed air between the feeding space and the product-discharge space.

14. The weighing device according to claim 11, wherein a flap space is provided at the bottom of said container.

15. The weighing device according to claim 14, wherein the shut-off member is mounted at the flap space and is designed as two double-bottom flaps, each of which is hinged about an axis running approximately through a central axis of said container.

16. The weighing device according to claim 15, wherein each double-bottom flap is provided with an individual control cylinder.

17. The weighing device according to claim 11, wherein a feeding space and a product-discharge space are provided at said container, said container being connected to the feeding space and the product-discharge space by a flexible sleeve in each case, and wherein corresponding transitional cross-sections between the container and each space has an equal area.

18. The weighing device according to claim 17, wherein the feeding space is constructed as a feed-head unit with said feed flap and is supported directly on said platform.

19. The weighing device according to claim 17, wherein the product-discharge space is constructed as a collecting compartment and is fastened to said platform.

20. The weighing device according to claim 17, wherein the product-discharge space is constructed as an intermediate compartment at said container and is fastened to said platform.

* * * * *